United States Patent [19]
Furusawa et al.

[11] Patent Number: 5,764,617
[45] Date of Patent: Jun. 9, 1998

[54] DISC LOADING DEVICE

[75] Inventors: Shigeharu Furusawa; Yoshimitsu Fukushima; Satoru Anada, all of Saitama-ken, Japan

[73] Assignee: Pioneer Electronic Corporation, Tokyo, Japan

[21] Appl. No.: 729,759

[22] Filed: Oct. 7, 1996

[30] Foreign Application Priority Data

Oct. 9, 1995 [JP] Japan .................. 7-287986

[51] Int. Cl.⁶ .................. G11B 17/22
[52] U.S. Cl. .................. 369/192; 369/36; 360/98.06
[58] Field of Search .................. 369/35–38, 75.1, 369/75.2, 77.1, 77.2, 178, 191, 192; 360/98.04–98.06

[56] References Cited

U.S. PATENT DOCUMENTS

| | | |
|---|---|---|
| 1,970,417 | 8/1934 | Dahlstrom .................. 369/37 |
| 4,674,077 | 6/1987 | Yoshimoto et al. .................. 369/37 |
| 4,695,990 | 9/1987 | Kawakami .................. 369/38 |
| 4,928,271 | 5/1990 | Verhagen .................. 369/292 |
| 5,187,695 | 2/1993 | Schindler et al. .................. 369/37 |
| 5,274,620 | 12/1993 | Sipos .................. 369/77.2 |
| 5,307,331 | 4/1994 | d'Alayer de Costemore d'Arc | 369/37 |
| 5,504,723 | 4/1996 | Ross .................. 369/37 |

FOREIGN PATENT DOCUMENTS

| | | |
|---|---|---|
| 748055 | 4/1956 | United Kingdom . |
| 1073700 | 6/1967 | United Kingdom . |

*Primary Examiner*—Jefferson Evans
*Attorney, Agent, or Firm*—Nikaido, Marmelstein, Murray & Oram LLP

[57] ABSTRACT

Disc reproducing device has a disc holder wherein a plurality of discs are horizontally arranged. A disc player is provided to be moved in parallel to an axial direction of the discs. A loading device is provided to load the disc on the disc player. The loading device has a first arm and a second arm which are rotatably provided in a plane perpendicular to the axial direction, and arranged so as to grip the disc to carry it.

9 Claims, 7 Drawing Sheets

DISC LOADING DEVICE

BACKGROUND OF THE INVENTION

The present invention relates to a device for reproducing a disc, and more particularly to a device provided with a disc holder wherein a plurality of discs are horizontally arranged in line, each in a vertical disposition.

There is known a conventional device for reproducing a disc wherein several tens of discs are vertically aligned in a horizontal direction, and a desired disc is picked by an automatic disc changer so as to be reproduced.

Referring to FIG. 13, such a conventional device has a plurality of horizontally arranged disc holders 300, in each of which are stored a plurality of vertically disposed discs 310. There is provided adjacent the disc holders 300, confronting the discs, a disc player 200 which slides in parallel to the axial direction of the discs 310 as shown by an arrow P, by the operation of a driving means (not shown). The disc player 200 has a disc loading arm 220 rotatably mounted on a pivot 221 at an upper corner portion of the disc player 200. When in the uppermost position, the arm 220 extends across the diameter of the discs 310. When rotated in a direction shown by an arrow Q, the arm 220 engages one of the discs 310 and urges the disc into the disc player 200. When disc player 200 is horizontally moved to select a disc, the arm 220 is disposed over discs so as not to interfere with the sliding movement of the disc player 200. However, the size of the entire reproducing device is inevitably increased.

SUMMARY OF THE INVENTION

An object of the present invention is to provide a device for reproducing a disc wherein the size thereof is reduced.

According to the present invention, there is provided a disc reproducing device comprising, a disc holder wherein a plurality of discs are horizontally arranged, each in a vertical disposition, a disc player provided to be moved in parallel to an axial direction of the discs, a loading device for taking out one of the discs from the disc holder and loading it on the disc player, the loading device having a first arm and a second arm which are rotatably provided in a plane perpendicular to the axial direction, a rotating axis of each of the first and second arms being disposed below the disc holder, the first and second arms being arranged so as to grip the disc to carry it.

The first arm is disposed below the disc holder, and the second arm is disposed adjacent the disc player.

First driving means is provided for rotating the first arm to be engaged with a periphery of the disc, and second driving means is provided for rotating the second arm to be engaged with the periphery of the disc, thereby to grip the disc.

These and other objects and features of the present invention will become more apparent from the following detailed description with reference to the accompanying drawings.

DETAILED DESCRIPTION OF THE PREFERRED EMBODIMENT

Figure 1:
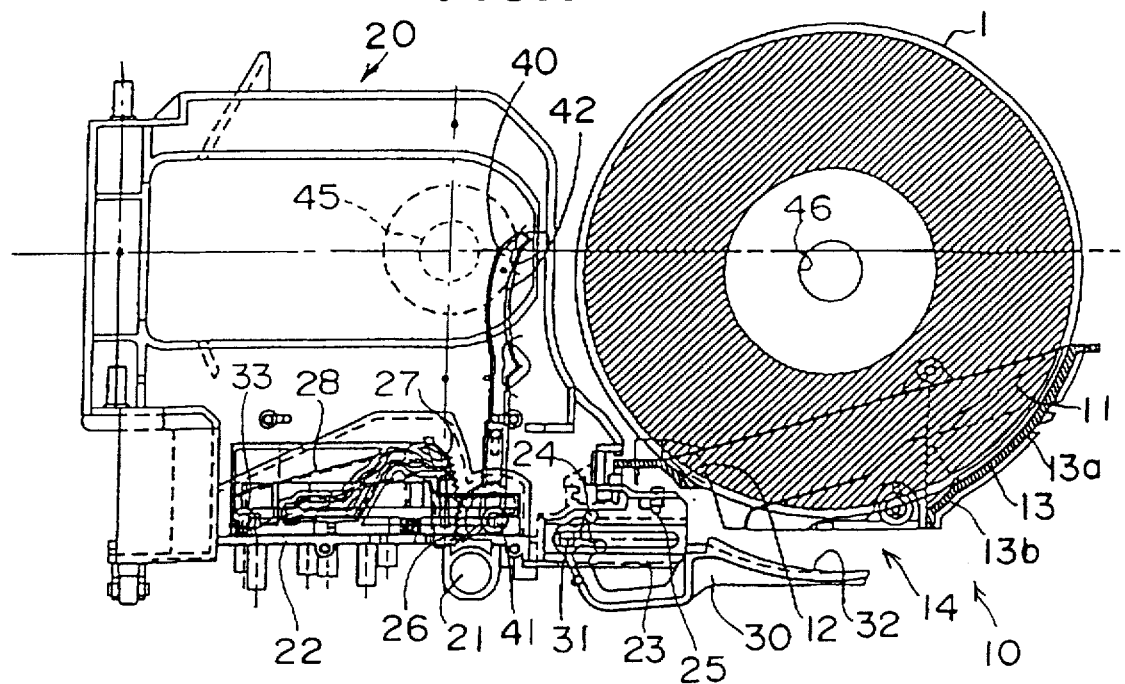
FIGS. 1 to 6 are elevational views of a device for reproducing a disc of the present invention, showing the operation thereof.
Figure 13:
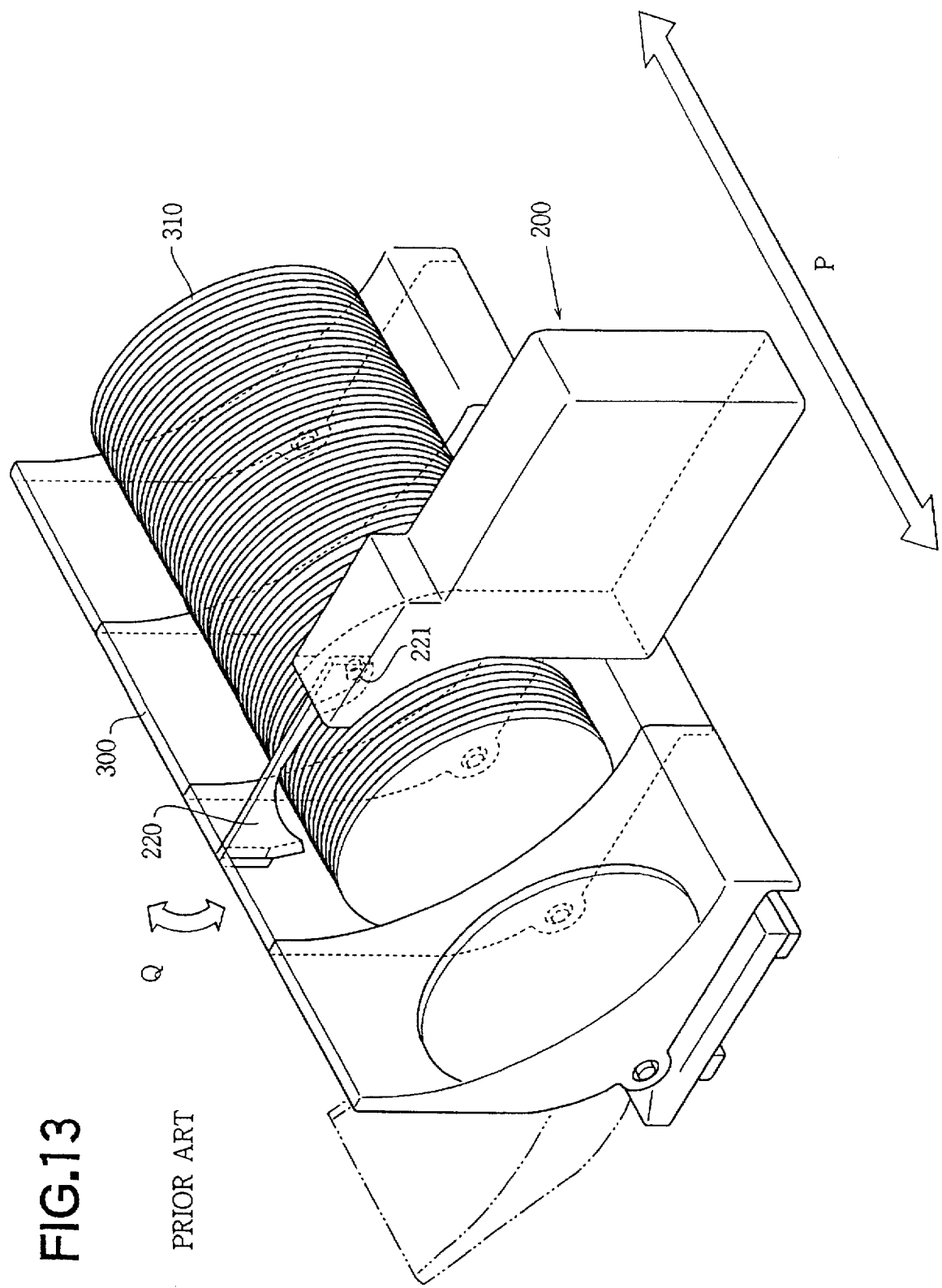
FIG. 13 is a perspective view of a conventional disc reproducing device.

Referring to FIG. 1, similar to the conventional device of FIG. 13, a disc reproducing device according to the present invention comprises a longitudinal disc holder 10 wherein a plurality of discs 1 are stored, and a slidable disc player 20 wherein one of the discs 1 in the holder 10 is loaded to be reproduced. The disc holder 10 comprises an arched disc support 12 adjacent the disc player 20, and an opposite arched disc support 13 spaced from the disc support 12 thereby forming an opening 14 therebetween. Each of the disc supports 12 and 13 is curved to correspond to the circumference of the disc 1, which is of a regular size, and also to a circumference of a smaller disc. More particularly, the disc support 13 has an upper portion 13a which conforms to the circumference of the disc 1 and a lower portion 13b which conforms to the circumference of the small disc.

The disc holder 10 is provided with a plurality of vertical partitions 11 extended between the disc supports 12 and 13. Each disc 1 is held in a space between the adjacent partitions 11 and supported by the supports 12 and 13 at the front lower periphery and the rear lower periphery, respectively.

The disc player 20, having a pickup, turntable and other devices for playing the discs, is slidably mounted on a longitudinal guide shaft 21 which is secured to the underside of a base plate 22 of the disc player 20, and disposed in parallel to the axial direction of the disc holder 10. The disc player 20 is moved on the shaft 21 by a driving means (not shown) so as to face a desired disc 1.

The disc player 20 is provided with a loading device for taking out one of the discs 1 from the disc holder 10 and loading it on the disc player 20. The loading device comprises a first arm 30 rotatably mounted on a pivot 31 and a second arm 40. The second arm 40 has a shaft 41 which is rotatably mounted on the base plate 22. Both of the pivots 31 and 41 are disposed at a positions lower than the array of discs 1.

The first rotatable arm 30 has a curved abutting portion 32, the curvature of which is substantially the same as that of the circumference of the disc 1. The second rotatable arm 40 also has a curved abutting portion 42.

A sliding member 23 is slidably mounted on the base plate 22 so as to be moved in the lateral direction with respect to the shaft 21. The first rotatable arm 30 has an actuating arm 24 which is abutted on a projection 25 of the sliding member 23.

A pinion 26 is secured to the shaft 41, and a sector gear 27 is engaged with the pinion 26. The sector gear 27 is provided on the end of an arm 28 which s rotatably mounted on the base plate 22 by a pivot 33.

A bifurcated cam groove 35 is provided on a sliding plate 43 slidably mounted on the base plate 22. The cam groove 35 is divided into a lower groove 36 and an upper groove 38 at a bifurcation 37. A projected pin (not shown) on the sector gear 27 is slidably engaged with the cam groove 35.

When not in motion, the first rotatable arm 30 is extended under the disc holder 10 while the second rotatable arm 40 stands upright inside the disc player 20. When rotated, the first arm 30 is adapted to enter the opening 14 formed between the disc supports 12 and 13.

The operation of the disc reproducing device when regular-sized discs 1 are stored in the disc holder 10 is now described.

Figure 2:
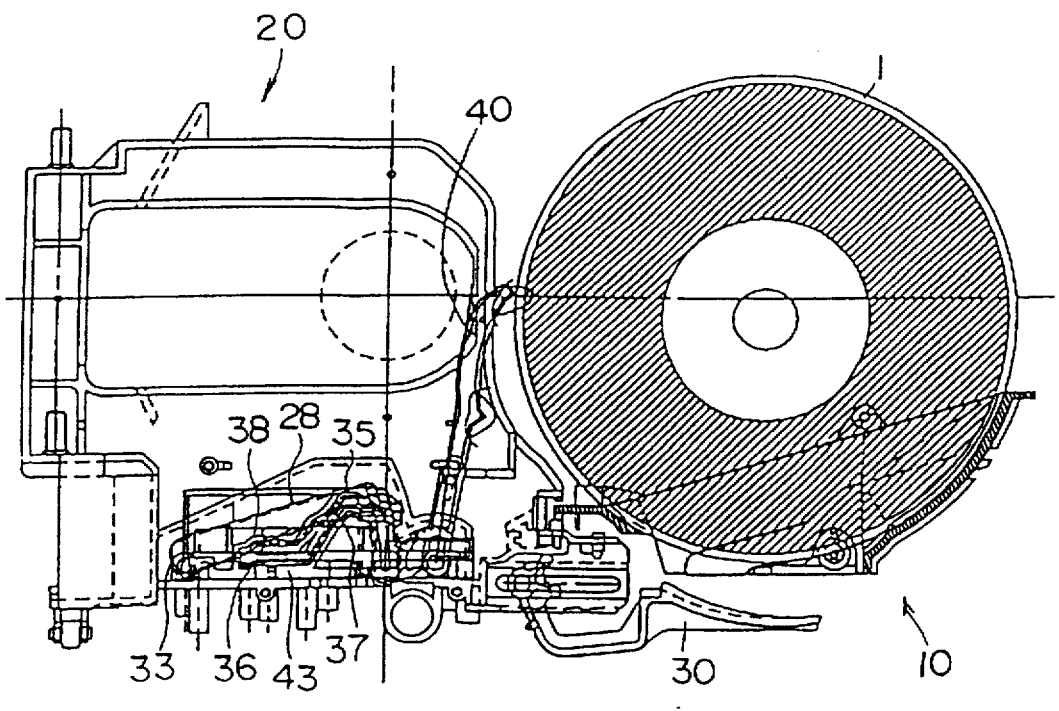

Referring to FIG. 1, when there is a loading command, the disc player 20 slides on the guide shaft 21 and stops in front of a desired disc 1. The sliding plate 43 is moved to the right, so that the arm 28 is rotated in the counterclockwise direction by the upward slope of the cam groove 35. Accordingly, the second rotatable arm 40 is rotated in the clockwise direction as shown in FIG. 2 by the sector gear 27 until the bifurcated tip end thereof abuts against the periphery of the disc 1.

Figure 3:
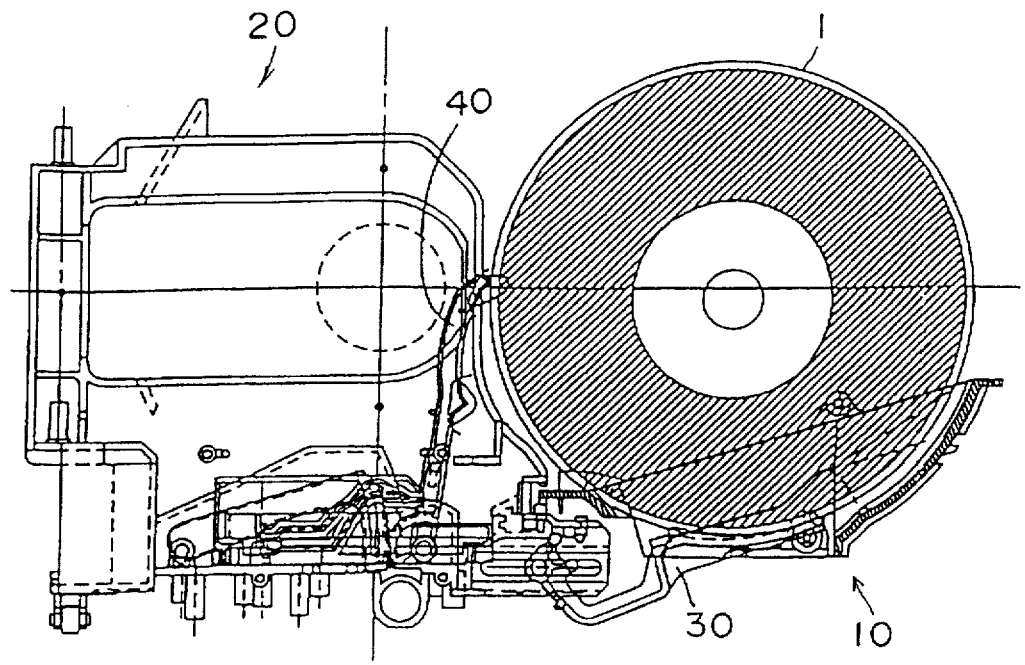
Figure 4:
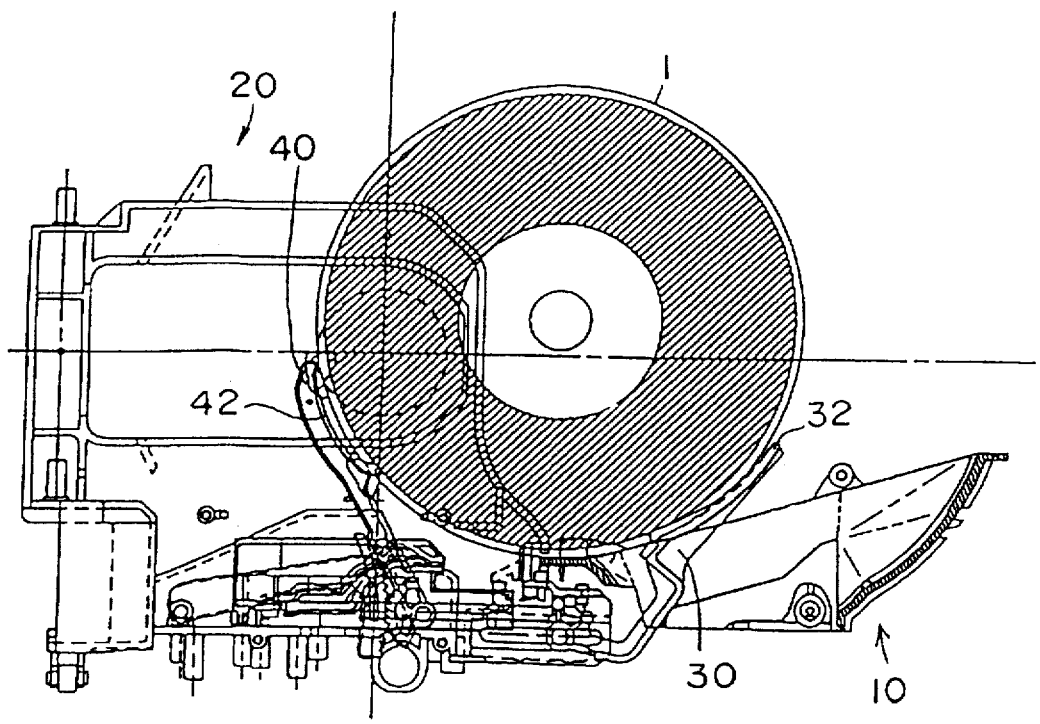
Figure 5:
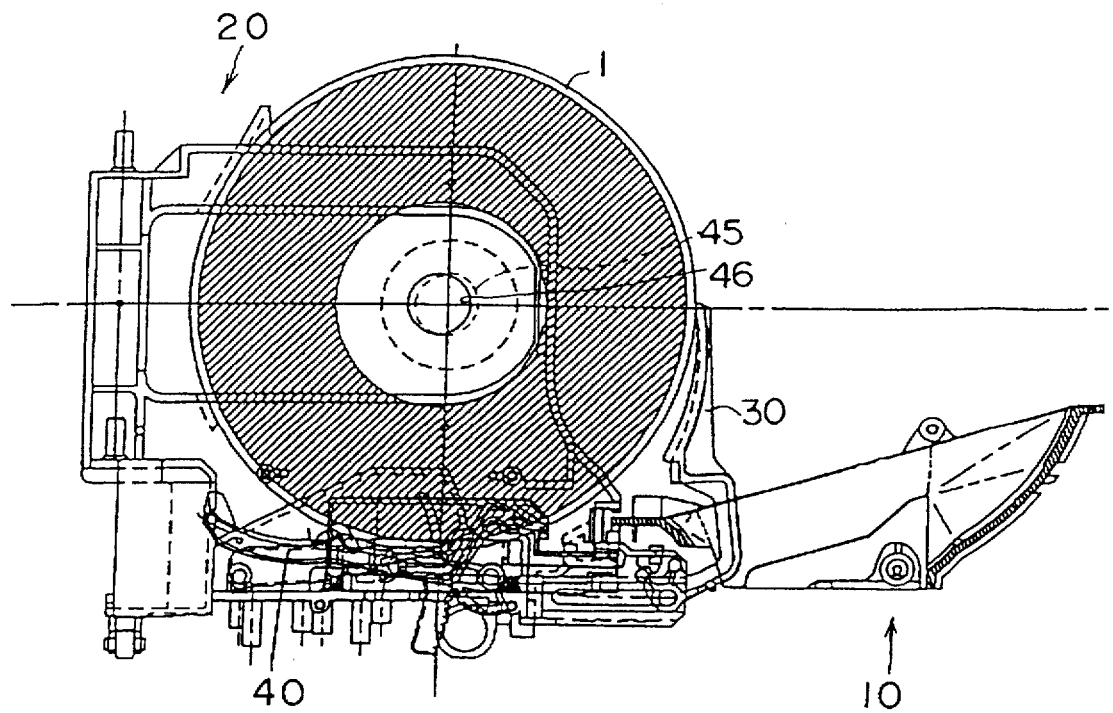

Thereafter, the sliding member 23 is moved to the left, so that projection 25 pushes the arm 24. Accordingly, the first arm 30 is rotated in the counterclockwise direction so as to enter the opening 14 as shown in FIG. 3. Hence the abutting portion 32 engages with the periphery of the disc 1. The first arm 30 is further rotated, the disc is released from the support 13 of the disc holder 10. On the other hand, the sliding plate 43 is further moved to the right, so that the gear 27 is rotated in the clockwise direction by the downward slope of the lower groove 36. Thus, the second arm 40 is rotated in the counterclockwise direction. As shown in FIG. 4, the first and second arms 30 and 40 are further rotated in the counterclockwise direction, thereby engaging the disc 1 with the abutting portion 42 of the second arm 40. The disc 1 is accordingly gripped by the first and second arms 30 and 40. The arms 30 and 40 are rotated to carry the disc 1 into the disc player 20 and reach the playing position shown in FIG. 5.

Figure 6:
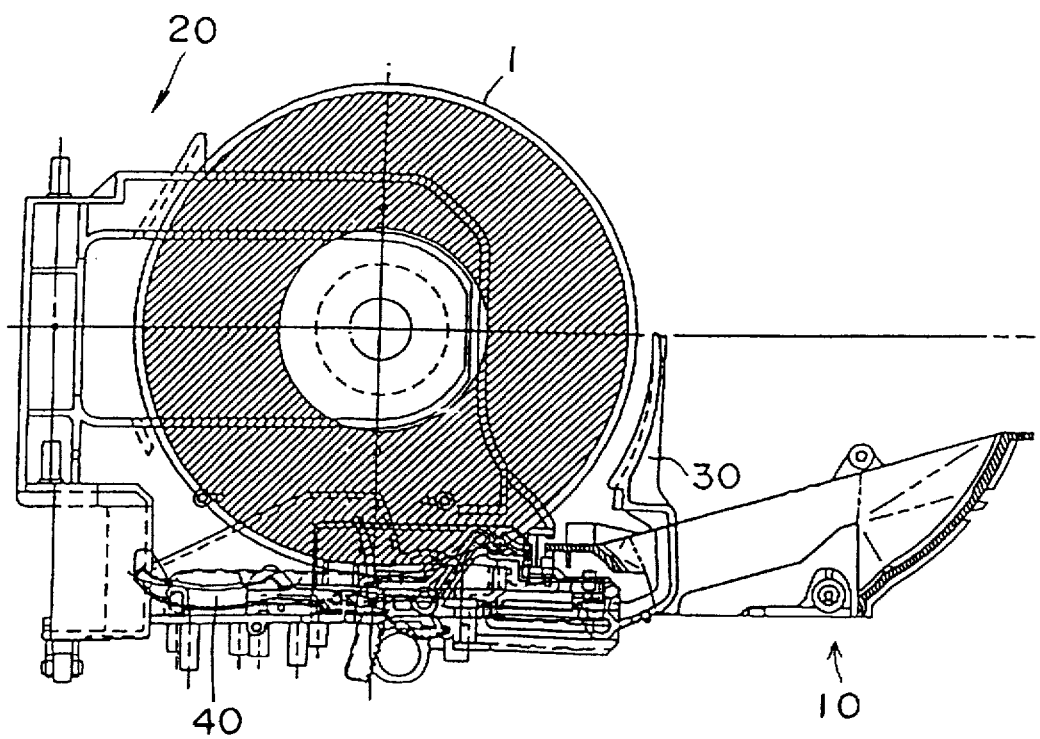

A turntable 45 is engaged with a center hole 46 of the disc 1. At this time, the disc 1 is slightly raised by a taper periphery of the turntable 45 so that the disc is released from the second arm 40. Right after the disc 1 is clamped, the first arm 30 is clockwisely rotated, and the second arm 40 is further rotated as shown in FIG. 6. Thus the disc 1 is ready for reproduction.

The above described operation is carried out in reverse when the disc 1 is put back in the holder 10.

A similar operation of the disc reproducing device when playing a small disc 2 is described hereinafter with reference to FIGS. 7 to 12.

Figure 7:
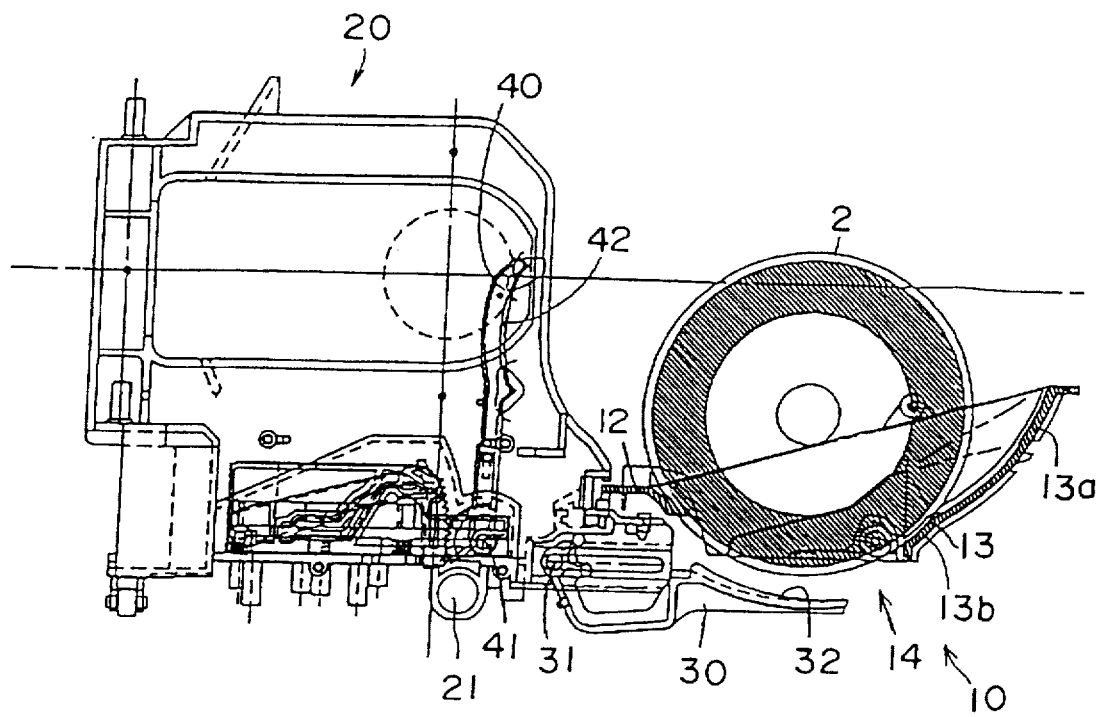
FIGS. 7 to 12 are elevational views of the device, showing the operation thereof when the discs provided therein are small discs.

Referring to FIG. 7, the discs 2 having a smaller diameter than the discs 1 are stored in the disc holder 10. Each disc 2 rests on the support 12 and the lower portion 13b of the support 13. The first and second arms 30 and 40 are at the same starting position as the operation for the large disc 1 shown in FIG. 1.

Figure 8:
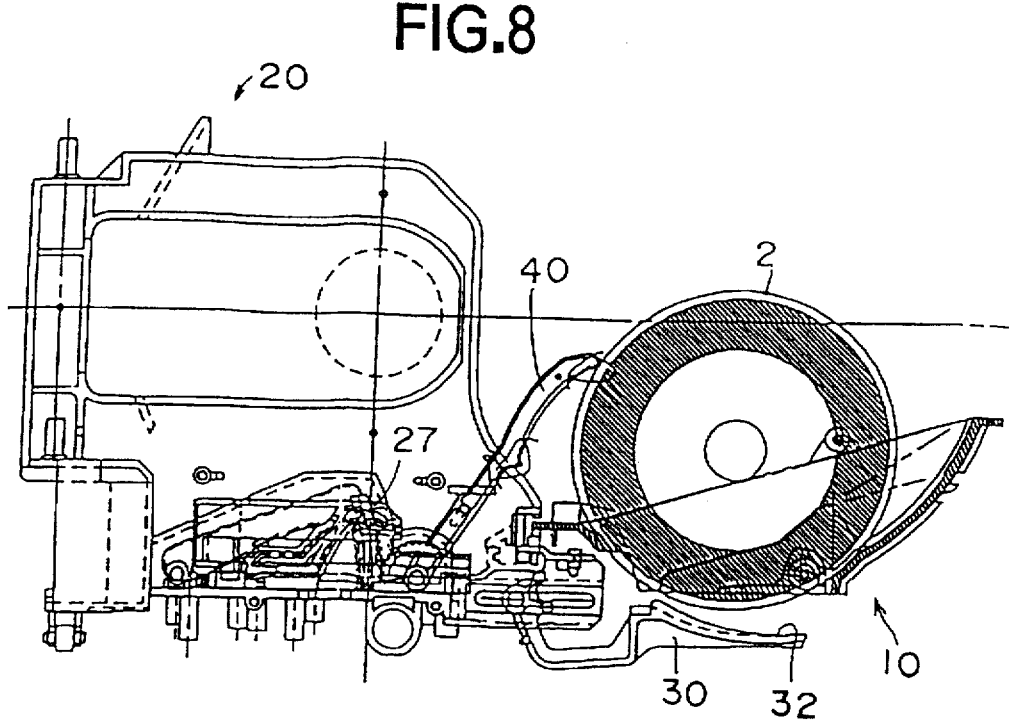

The disc player 20 is moved to a desired position in accordance with the loading command. The second rotatable arm 40 is rotated in a clockwise direction as shown in FIG. 8 until the tip end thereof abuts against the periphery of the disc 2. Since the disc 2 is smaller than the disc 1, the position of the second arm 40 differs from that shown in FIG. 2. Thus the pin on the sector gear 27 engaged with the uppermost inside wall of the cam groove 35.

Figure 9:
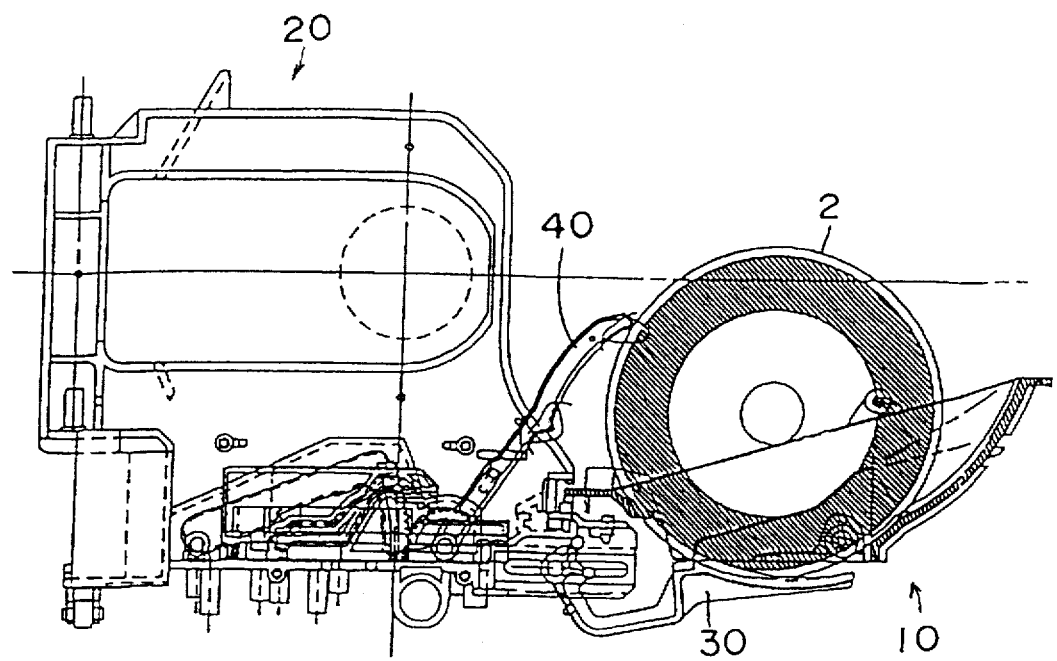
Figure 10:
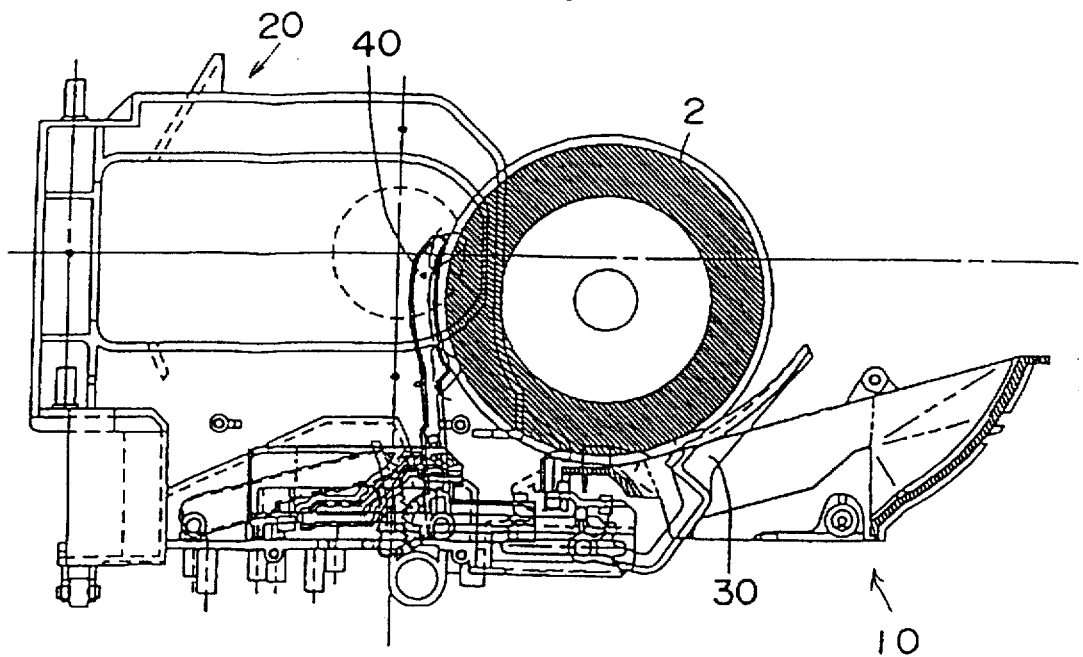

The first arm 30 is thereafter rotated in the counterclockwise direction so as to enter the opening 14 as shown in FIG. 9. The disc 2 is accordingly supported by the abutting portion 32 of the arm 30. When the first arm 30 is further rotated, the disc 2 is released from the support 13 of the disc holder 10. As shown in FIG. 10, as the first arm 30 is further rotated in the counterclockwise direction, the second arm 40 is also rotated in the counterclockwise direction, thereby engaging the disc 2 with the abutting portion 42. The disc 2 is accordingly gripped by the first and second arms 30 and 40. At that time, the pin of the gear 27 engages with the upper groove 38. In order to hold the disc 2, the distance between the first and second arms 30 and 40 must be smaller than when holding the disc 1. This end is achieved by the engagement of the pin with the upper groove 38. On the contrary, since the first arm 30 is operated in roughly the same manner as when loading the larger disc 1, the operating mechanism and the control thereof can be simplified. Thus the operability of the reproducing device is not marred.

Figure 11:
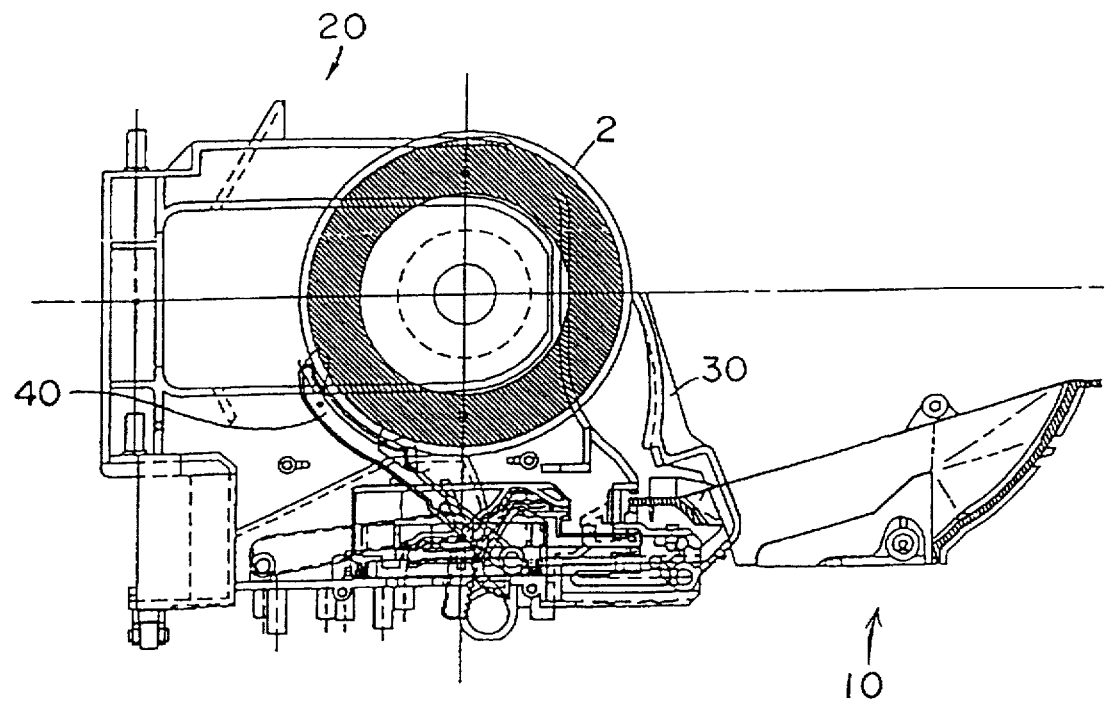
Figure 12:
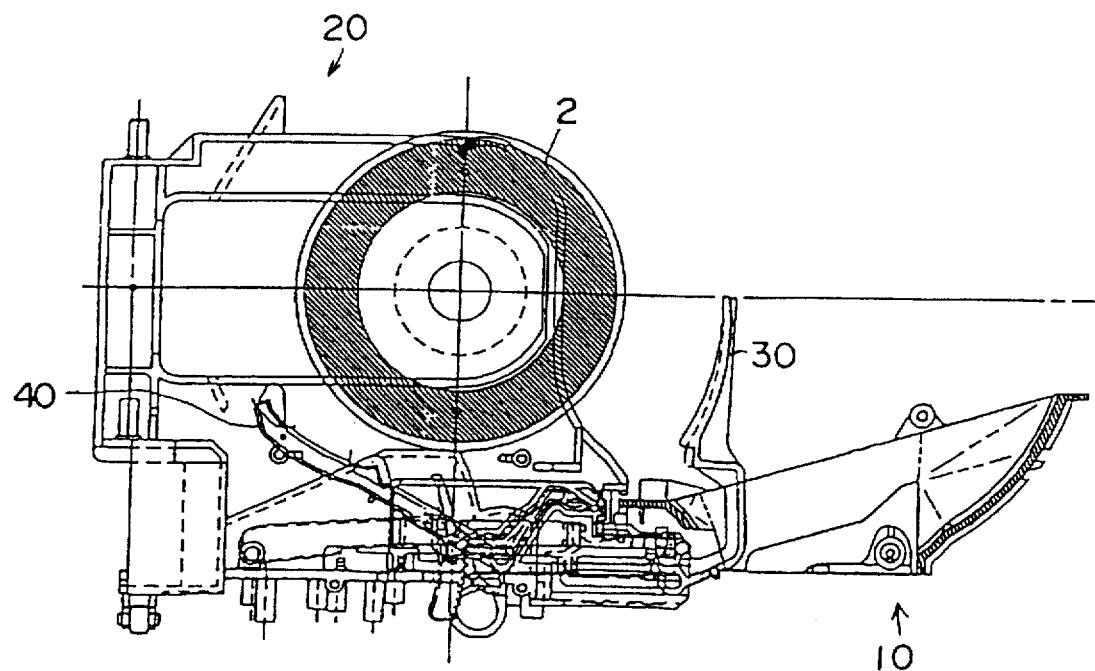

The arms 30 and 40 are further counterclockwisely rotated as they grip and carry the disc 2 to the playing position in the disc player 20 as shown in FIG. 11. As shown in FIG. 12, the disc 2 is thereafter clamped on the turntable of the disc player 20. The first and second arms 30 and 40 are rotated, thereby releasing the disc 2 so as to be reproduced.

In accordance with the disc reproducing device of the present invention, the pivots of the rotating arms 30 and 40 are positioned below the discs which are stored in the disc holder 10. Hence the height of the device can be reduced. In addition, the first arm 30 supports the disc 1 at the underside thereof when carrying the disc so that the disc can be smoothly moved. Since the first arm 30 must pass through the space between the partitions 11 in order to abut on the disc, the arm 30 can be accurately positioned in relation to the disc.

While the invention has been described in conjunction with preferred specific embodiment thereof, it will be understood that this description is intended to illustrate and not limit the scope of the invention, which is defined by the following claims.

What is claimed is:

1. Disc reproducing device comprising:

a disc holder provided for holding a plurality of discs, said plurality of discs including at least two discs having different diameters, wherein the discs are horizontally arranged, each in a vertical disposition;

a disc player having a turntable and provided to be moved in parallel to an axial direction of the discs;

a loading device for taking out one of the discs from the disc holder and loading it on the disc player;

the loading device having a first arm and a second arm which are rotatably provided in a plane perpendicular to the axial direction, a rotating axis of each of the first and second arms being disposed below the disc holder, the first and second arms being arranged so as to grip the disc to carry it such that a center of each of the different diameter discs is located at a position approximately coincide with a center of the turntable of the disc player.

2. The disc reproducing device according to claim 1 wherein the disc holder is provided with a plurality of vertical partitions, a pair of the partitions are provided to store one of the discs, and with a pair of disc supports.

3. The disc reproducing device according to claim 1 wherein the first arm is disposed below the disc holder, and the second arm is disposed adjacent the disc player.

4. The disc reproducing device according to claim 3 further comprising first driving means for rotating the first arm to be engaged with a periphery of the disc, and second driving means for rotating the second arm to be engaged with the periphery of the disc, thereby to grip the disc.

5. The disc reproducing device according to claim 4 wherein the first and second driving means are arranged to load the disc on the disc player, keeping the gripping of the disc by the first and second arms.

6. The disc reproducing device according to claim 3 wherein the first and second arms are mounted on the disc player so as to be moved together with the disc player.

7. A disc reproducing device as recited in claim 1, wherein said first arm and said second arm are movable relative to each other.

8. A disc reproducing device as recited in claim 1, wherein said first arm engages the disc at a lowermost position thereof.

9. A disc reproducing device as recited in claim 1, wherein said first arm and said second arm are movable relative to each other such that said first arm and said second arm are coincidentally in contact an outer periphery of the disc.

* * * * *